United States Patent [19]
Dixon

[11] 3,847,390
[45] Nov. 12, 1974

[54] PNEUMATIC SHEET CONVEYOR

[75] Inventor: John Allen Dixon, Valliant, Okla.

[73] Assignee: Weyerhaeuser Company, Tacoma, Wash.

[22] Filed: Mar. 21, 1973

[21] Appl. No.: 343,604

[52] U.S. Cl. ................................. 271/195, 226/97
[51] Int. Cl. ............................................. B65h 5/22
[58] Field of Search .......... 271/52, 59, 195; 226/95, 226/97; 302/29, 31

[56] References Cited
UNITED STATES PATENTS

| | | | |
|---|---|---|---|
| 3,395,943 | 8/1968 | Wilde et al. | 271/59 X |
| 3,698,538 | 10/1972 | Groeber | 197/33 AD |
| 3,734,567 | 5/1973 | Fong | 302/31 X |
| 3,747,922 | 7/1973 | Groeber | 302/31 X |

Primary Examiner—Evon C. Blunk
Assistant Examiner—James W. Miller

[57] ABSTRACT

A pneumatic sheet conveying device is comprised of an elongated conduit having a slot along one side with a plurality of air jets directed inwardly and longitudinally along the conduit to convey an edge of the sheet material from the input end to the output end. An apron portion at the inlet end is provided in order to easily thread the sheet material into the longitudinal slot. An operator can efficiently and quickly thread the sheet material and convey it to any suitably desired downstream position.

4 Claims, 5 Drawing Figures

PATENTED NOV 12 1974          3,847,390
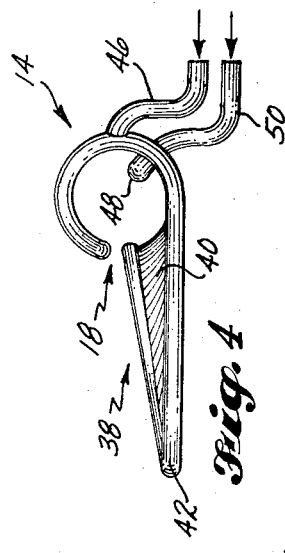
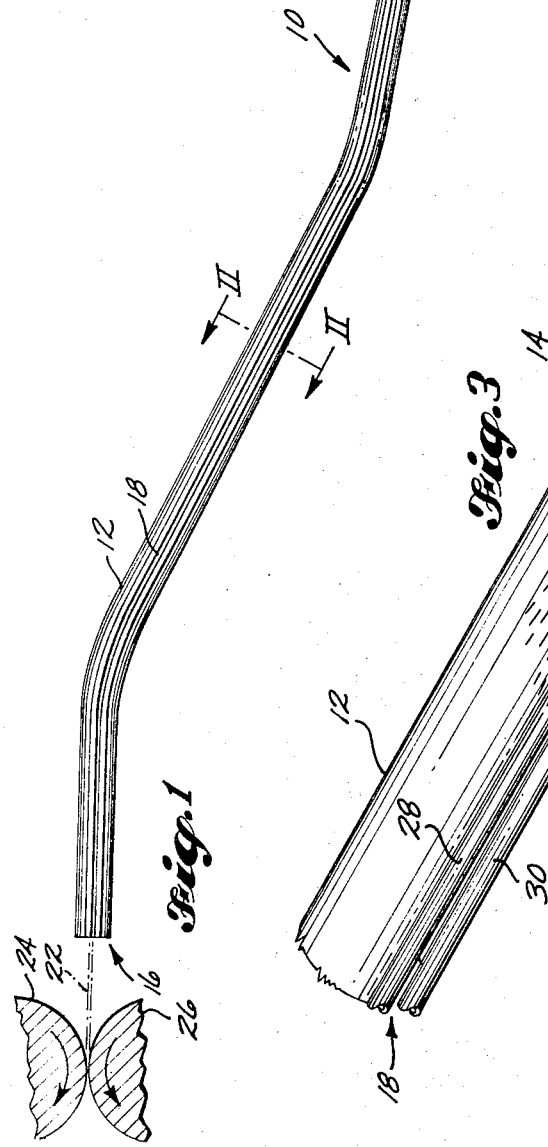
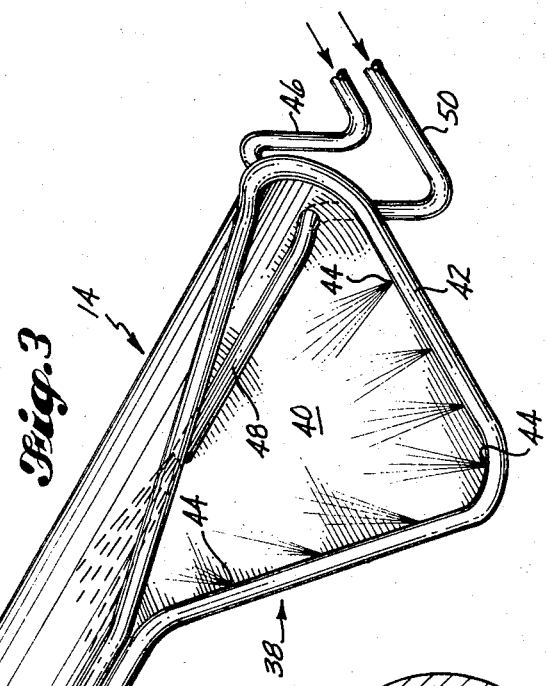
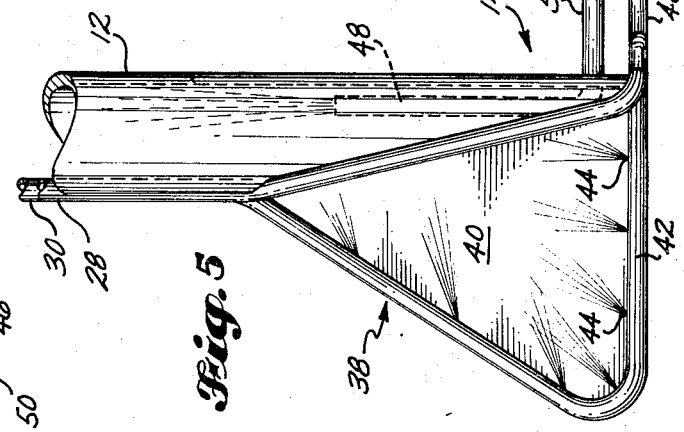

PNEUMATIC SHEET CONVEYOR

BACKGROUND OF THE INVENTION

This invention relates generally to a pneumatic sheet conveying device and more particularly to a sheet conveying device that can quickly transport a relatively wide sheet of flexible material between two desired points.

When manufacturing wide sheets of flexible material such as paper products where the thickness is minimal in relation to the sheet width, it oftentimes becomes necessary to direct a free end of the sheet material into some downstream apparatus. This is exemplified in the typical paper manufacturing process where a free end of the paper sheet exits the dryer and must then be directed into the next downstream apparatus which is normally the nip of a pair of calender rolls. Free ends in sheet material are undesirable when they result within the continuous manufacturing process because they then must be properly positioned back into the process.

In the prior art there are several alternative methods for positioning flexible sheet material at the downstream point. One such commercially available method and apparatus is known in the industry as an "air chute" and is available from the Beloit Company. Briefly, this device supports one edge of the sheet on a generally flat conveyor surface with the conveying function being accomplished through air jets that operate to convey the edge of the sheet linearly while the proper vertical positioning of the sheet is caused by placement of the generally flat conveyor surface. In many paper mills where suitable air chutes are not available, the free end of the flexible sheet material is positioned at the next downstream apparatus manually. As one would expect, manual positioning of the flexible sheet is difficult and can create serious safety hazards for the operators.

The present invention was conceived to alleviate some of the problems with prior art sheet threading and conveying devices. The problems with the prior art devices in addition to those previously mentioned were that the particular devices tended to be inaccurate in conveying the free end of the sheet material to a particular point such as into the nip of a pair of calender rolls in a paper machine.

Accordingly from the foregoing, one object of the present invention is to provide a simple and efficient pneumatic sheet conveying and threading apparatus.

Another object is to provide such a conveying apparatus that will transport the flexible sheet material at very high speeds to a preselected point downstream from the free end.

Yet a further object is to provide a sheet conveying a threading apparatus that is highly reliable and accurate in directing the free end of the sheet to the proper downstream position.

These and other objects of the present invention will become more apparent upon reading the following specification in conjunction with the attached drawing.

SUMMARY OF THE INVENTION

Briefly the present invention is practiced in one form by providing an elongated conduit with a longitudinal slot along one side thereof and with an outlet end for discharging sheet material and an inlet end for accepting the sheet material. Gaseous jet means are provided at a plurality of positions along the slot to hold one edge of the sheet material in an engaged relationship with the slot. Additional gaseous jet means are provided to convey the edge of the sheet material along the slot from the inlet end to the outlet end. The outlet end of the elongated conduit can be positioned appropriately so as to cause the edge of the sheet material to be directed to a predetermined point.

BRIEF DESCRIPTION OF THE DRAWING

FIG. 1 is a side view of the pneumatic sheet conveying device.

FIG. 2 is a cross sectional view taken through plane II—II of FIG. 1 showing the longitudinally extending slot in relation to the circumferential conduit at a position where gaseous jet means are provided.

FIG. 3 is an isometric view showing the inlet end of the pneumatic sheet conveying device.

FIG. 4 is an end view also showing the inlet end.

FIG. 5 is a top view showing the inlet end for the pneumatic sheet conveying device.

DESCRIPTION OF THE PREFERRED EMBODIMENT

Turning now to a detailed description of the present invention and turning first to FIG. 1, the pneumatic sheet conveying device comprising the present invention is generally depicted at 10. The sheet conveying device 10 is comprised essentially of an elongated conduit 12 which has an inlet end generally depicted at 14 and an outlet end generally depicted at 16. Extending the length of the elongated conduit 12 and along one side thereof is a longitudinal slot 18 which extends from the inlet end 14 to the outlet end 16. It is generally within the elongated conduit 12 and through the longitudinal slot 18 that one edge of a flexible sheet material will be engaged in order to be conveyed between the inlet end 14 and the outlet end 16.

As depicted on FIG. 1 by the dot-dash lines 20 at the inlet end 14 and the dot-dash lines 22 at the outlet end 16, it will be appreciated that the flexible sheet material will be transported along the path of travel 20, along the length of the slot 18, and outwardly from the outlet end 16 along the path of travel 22. The pneumatic sheet conveying device 10 in FIG. 1 is shown with its outlet end 16 being directed toward the nip of a pair of opposed roll members 24, 26. The opposed roll members 24, 26 could be, for example, a pair of calender rolls in a paper machine. Conversely, at the inlet end 14 of the sheet conveying device 10, the free end of the sheet material that is to be conveyed into the nip of the opposed roll members 24, 26 can be coming from any suitable upstream station. As an example in a paper machine the free end of the sheet material could be exiting from the dryer (not shown).

Turning now to FIG. 2, a cross sectional view of the sheet conveying device 10 is depicted. The elongated conduit 12 is, in the present embodiment, comprised of a circular tube having the longitudinal slot 18 positioned along one side. Affixed to the edges of the slot 18 is a pair of longitudinally extending tubes indicated at 28 and 30, respectively. The distance between tubes 28, 30 is that distance forming the longitudinal slot 18. Appropriately spaced along the length of the tubes 28, 30 are a plurality of jet holes collectively designated as 32 in tube 28 and 34 in tube 30. The jet holes 32, 34 are directed toward the interior of the elongated conduit 12 and each hole provides a jet of gaseous fluid in the directional array as depicted in FIG. 2, that is generally across a horizontal plane 36 which is essentially the path of travel of the sheet edge within the pneumatic sheet conveying device 10. The tubes 28, 30 extend the full length of the elongated conduit 12 and are constructed so as to operate at pressures within a range of from 60 psi to approximately 100 psi. The jet holes 32, 34 also offer a downstream force by way of the gaseous fluid because they are skewed in the downstream direction.

Turning now to FIG. 3, the inlet end 14 is shown in greater detail. Provided as a convenient entry means for the sheet edge into the elongated conduit 12 is an appropriately designed apron depicted generally as 38. Essentially apron 38 is an aid to the operator in threading the sheet material into the slot 18. At the inlet end 14 the apron is comprised essentially of a generally flat portion as an extension of the elongated conduit 12 and is depicted as 40. Extending around the edges of apron 38 are the extended tubes 28, 30, essentially offering a closed pressure system. Similarly positioned within the tube portion which is designated as 42 along the apron 38 are a plurality of jet holes 44 which are directed generally inward toward the interior of the apron and longitudinally down into the elongated conduit 12. A suitable source of gas under pressure such as air is provided to the pair of tubes 28, 30 and the tube portion 42 through a suitable inlet pipe 46. The source of gas under pressure is not shown in the drawing but could come from any suitable source such as an air compressor. An additional gas jet is positioned at the inlet end 14 within the apron area 38 in order to provide additional longitudinal motive force for the sheet material. A jet pipe is depicted at 48 which is oriented so as to direct a longitudinal jet of air generally into the elongated conduit 12. The inlet portion to the jet pipe 48 is depicted as 50 which in turn is connected to a suitable source of gaseous fluid under pressure (not shown). Inlet pipes 46 and 50 are positioned to one side of the apron 38 in order to cause minimum interference with the entering sheet material as it is threaded into the pneumatic sheet conveying device 10. A corresponding end view of the apron 38 is depicted in FIG. 4 and indicates how the flat portion 40 of apron 38 traverses a transition distance toward the entrance to the elongated slot 18. Depicted in FIG. 5 is a top plan view of the apron portion 38 and clearly depicts the horizontal open extension to the flat portion 40 to aid the operator in threading the sheet material.

Operation of the Invention

When there is a need for the operator to convey sheet material from one position to another, he simply threads one edge of the sheet material into the sheet conveying device 10 by positioning the edge, preferably having a tail cut therein, onto the apron 38. With the gaseous jets being directed in the manner as depicted on the drawings and previously described, they will operate to quickly suck the edge of the sheet material into the longitudinally extending slot 18 and with the longitudinally directed gaseous jets the edge of the sheet material will be conveyed along the length of the sheet conveying device 10 and will exit at the outlet end 16. The outlet end 16 can be directed to any suitably desired position. Depending upon the weight of the sheet material to be conveyed, the gaseous pressures can be varied accordingly.

Thus it will be appreciated by those skilled in the sheet conveying art that a simple, efficient and fast pneumatic sheet conveying device has been disclosed that will allow an operator to suitably convey and position a flexible sheet material. While a detailed description of the principal embodiment has been given, it will be recognized that other modifications can be made that do not depart from the spirit of the invention. All such modifications are intended to be included within the scope of the appended claims.

What is claimed is:

1. A pneumatic conveying device for transporting thin flexible sheet material having an upstream inlet end and a downstream outlet end comprising:
    an elongated conduit having a slot along one side thereof extending longitudinally from the inlet end to the outlet end,
    means positioned along both edges and substantially the full length of said slot to contain a supply of gas under pressure,
    said gas containing means having generally smooth spaced apart continuous surfaces with the space therebetween being greater than the thickness of the sheet material to be conveyed,
    a plurality of jet holes positioned in and spaced along the length of said gas containing means and directed inwardly toward the center of said conduit such that gaseous jets are uniformly directed across a plane that extends generally through said slot and the center of said conduit, and
    at least a portion of said jet holes being uniformly positioned in said gas containing means such that they are skewed in the downstream direction, whereby the gaseous jets exiting from said skewed jet holes tend to cause the sheet material to travel in the downstream direction toward said outlet end.

2. The device as in claim 1 including means at the inlet end to aid in directing the sheet material into said slot.

3. The device as in claim 2 wherein said aiding means includes an apron extending outwardly from said slot to accept and support an edge on the sheet material as it is being inserted into said slot.

4. The device as in claim 1 including a jet pipe at the inlet end of said conduit directed generally in the downstream direction in order to provide additional motive force through a gaseous jet exiting therefrom to the sheet material as it is being conveyed.

* * * * *